US012737592B2

(12) United States Patent
David et al.

(10) Patent No.: US 12,737,592 B2
(45) **Date of Patent: *Sep. 15, 2026**

(54) PARTIAL ACTIVATION OF MULTIPLE PATHWAYS IN NEURAL NETWORKS

(71) Applicant: NANO DIMENSION TECHNOLOGIES, LTD., Ness Ziona (IL)

(72) Inventors: Eli David, Tel Aviv (IL); Eri Rubin, Ma'ale Ha'hamisha (IL)

(73) Assignee: NANO DIMENSION TECHNOLOGIES, LTD., Nes Ziona (IL)

( * ) Notice: Subject to any disclaimer, the term of this patent is extended or adjusted under 35 U.S.C. 154(b) by 120 days.

This patent is subject to a terminal disclaimer.

(21) Appl. No.: 18/931,819

(22) Filed: Oct. 30, 2024

(65) Prior Publication Data

US 2025/0061306 A1 Feb. 20, 2025

Related U.S. Application Data

(63) Continuation of application No. 17/134,690, filed on Dec. 28, 2020, now Pat. No. 12,141,678, which is a (Continued)

(51) Int. Cl.
*G06N 3/045* (2023.01)
*G06F 7/58* (2006.01)
*G06N 3/08* (2023.01)

(52) U.S. Cl.
CPC ............... *G06N 3/045* (2023.01); *G06N 3/08* (2013.01); *G06F 7/58* (2013.01)

(58) Field of Classification Search
CPC ............. G06N 3/045; G06N 3/08; G06F 7/58
See application file for complete search history.

(56) References Cited

U.S. PATENT DOCUMENTS 10,366,322 B2 7/2019 David
2006/0184462 A1 8/2006 Hawkins
(Continued)

FOREIGN PATENT DOCUMENTS

CN 106997485 8/2017
CN 107341539 11/2017
(Continued)

OTHER PUBLICATIONS

Anwar et al. Structured Pruning of Deep Convolutional Neural Networks. ACM Journal on Emerging Technologies in Computing Systems, vol. 13, No. 3, Article 32, Publication date: Feb. 2017. (Year: 2017).*

(Continued)

*Primary Examiner* — Michelle T Bechtold
*Assistant Examiner* — Robert Bejcek, II
(74) *Attorney, Agent, or Firm* — PEARL COHEN LLP

(57) ABSTRACT

A device, system, and method for approximating a neural network comprising N synapses or filters. The neural network may be partially-activated by iteratively executing a plurality of M partial pathways of the neural network to generate M partial outputs, wherein the M partial pathways respectively comprise M different continuous sequences of synapses or filters linking an input layer to an output layer. The M partial pathways may cumulatively span only a subset of the N synapses or filters such that a significant number of the remaining the N synapses or filters are not computed. The M partial outputs of the M partial pathways may be aggregated to generate an aggregated output approximating an output generated by fully-activating the neural network by executing a single instance of all N synapses or filters of the neural network. Training or prediction of the neural network may be performed based on the aggregated output.

20 Claims, 4 Drawing Sheets

Related U.S. Application Data continuation-in-part of application No. 16/722,639, filed on Dec. 20, 2019, now Pat. No. 10,878,321, which is a continuation-in-part of application No. 16/288,866, filed on Feb. 28, 2019, now Pat. No. 10,515,306.

(56) References Cited

U.S. PATENT DOCUMENTS

| | | | |
|---|---|---|---|
| 2017/0277658 | A1 | 9/2017 | Pratas et al. |
| 2018/0174023 | A1 | 6/2018 | Imam et al. |
| 2018/0276035 | A1 | 9/2018 | Henry et al. |
| 2018/0285716 | A1 | 10/2018 | Markram et al. |
| 2018/0322606 | A1 | 11/2018 | Das et al. |
| 2019/0108436 | A1 | 4/2019 | David |
| 2020/0209810 | A1 | 7/2020 | Bazhenov et al. |
| 2020/0265304 | A1 | 8/2020 | Chanrashekar et al. |

FOREIGN PATENT DOCUMENTS

| | | |
|---|---|---|
| CN | 109328361 | 2/2019 |
| JP | A1995200512 | 8/1995 |
| JP | A2015210747 | 11/2015 |

OTHER PUBLICATIONS

Srivastava et al. Improving Neural Networks with Dropout. University of Toronto. 2013 (Year: 2013).*

Poole, D.L. et al. "Artificial Intelligence—Foundations of Computational Agents", Cambridge University Press, NewYork, 1$^{st}$ Ed., Jan. 31, 2010 (Jan. 31, 2010), retrieved from https://www.researchgate.net/file.PostFileLoader.html?id=5440e3bdd5a31298288b45fe&assetKev-AS%3A273625985290242%401442248926315 on Nov. 2, 2021 (Feb. 11, 2021).

Mackworth, Alan, What is Artificial Intelligence? CPSA 322—Intro 1, Jan. 2, 2013, Textbook 1.1-1.3, Lecture Slides, 28 pages.

Gao X. et al., Dynamic Channel Pruning: Feature Boosting and Suppression, Jan. 28, 2019, XP055807754, DOI: 10.17863/CAM.47018.

Wang Yulong et al., Interpret Neural Networks by Identifying Critical Data Routing Paths, 2018 IEEE/CVF Conference on Computer Vision and Pattern Recognition, IEEE, Jun. 18, 2018, pp. 8906-8914, XP0334783815, DOI:10.1109/CVPR.2018.00928.

Youcheng Sun, Xiaowei Huang, and Daniel Kroening. 2018. Testing Deep Neural Networks. arXiv preprint arXiv: 1803.04792 (2018).

Navarro, Roger Isanta, Study of a neural network-based system for stability augmentation of an airplane Sep. 2013. Escola Techica Superior d'Enginyeries Industrial Aeronautica de Terrassa, Universitat Politechnica De Catalunya.

Downing, Keith L. "Learning via Synaptic Tuning." Chapter 10, pp. 231-274. (2015).

Friedrich, Johannes, and Mate Lengyel. "Goal-directed decision making with spiking neurons." Journal of Neuroscience 36, No. 5 (2016): 1529-1546.

Sun, Xiaoyu, Xiaochen Peng, Pai-Yu Chen, Rui Liu, Jae-Sun Seo, and Shimeng Yu. "Fully parallel RRAM synaptic array for implementing binary neural network with(+ 1,− 1) weights and(+ 1, 0) neurons." In 2018 23rd Asia and South Pacific Design Automation Conference (ASP-DAC), pp. 574-579. IEEE, 2018.

Sun et al., Testing Deep Neural Networks, Mar. 10, 2018, arXiv preprint ArXiv:1803.04792.

* cited by examiner

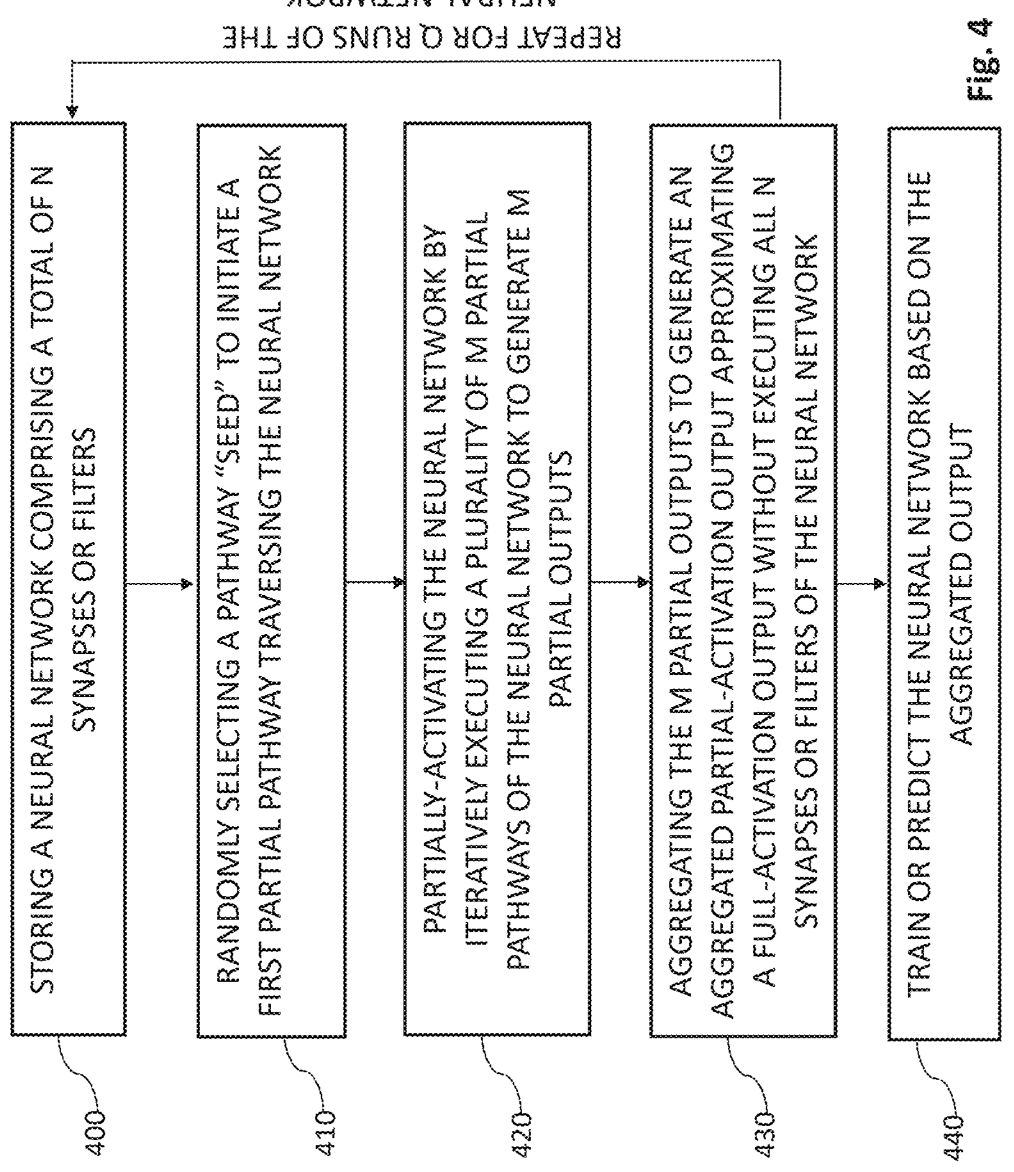
STORING A NEURAL NETWORK COMPRISING A TOTAL OF N SYNAPSES OR FILTERS
400
RANDOMLY SELECTING A PATHWAY "SEED" TO INITIATE A FIRST PARTIAL PATHWAY TRAVERSING THE NEURAL NETWORK
410
PARTIALLY-ACTIVATING THE NEURAL NETWORK BY ITERATIVELY EXECUTING A PLURALITY OF M PARTIAL PATHWAYS OF THE NEURAL NETWORK TO GENERATE M PARTIAL OUTPUTS
420
AGGREGATING THE M PARTIAL OUTPUTS TO GENERATE AN AGGREGATED PARTIAL-ACTIVATION OUTPUT APPROXIMATING A FULL-ACTIVATION OUTPUT WITHOUT EXECUTING ALL N SYNAPSES OR FILTERS OF THE NEURAL NETWORK
430
TRAIN OR PREDICT THE NEURAL NETWORK BASED ON THE AGGREGATED OUTPUT
440
REPEAT FOR Q RUNS OF THE NEURAL NETWORK
Fig. 4

PARTIAL ACTIVATION OF MULTIPLE PATHWAYS IN NEURAL NETWORKS

CROSS-REFERENCE TO RELATED APPLICATIONS

This application is a Continuation of U.S. patent application Ser. No. 17/134,690 filed Dec. 28, 2020 which will issue as U.S. Pat. No. 12,141,678 on Nov. 12, 2024, which in turn is a Continuation-In-Part of U.S. patent application Ser. No. 16/722,639 filed Dec. 20, 2019, which issued as U.S. Pat. No. 10,878,321 on Dec. 29, 2020, which in turn is a Continuation-In-Part of U.S. patent application Ser. No. 16/288,866 filed Feb. 28, 2019, which issued as U.S. Pat. No. 10,515,306 on Dec. 24, 2019, all of which are hereby incorporated by reference in their entirety.

FIELD OF THE INVENTION

Embodiments of the invention are related to the field of artificial intelligence (AI) by machine learning. In particular, embodiments of the invention are related to deep learning using neural networks.

BACKGROUND OF THE INVENTION

An artificial neural network, or simply "neural network" (NN), is a computer model, resembling a biological network of neurons, which is trained by machine learning. A traditional neural network has an input layer, multiple middle or hidden layer(s), and an output layer. Each layer has a plurality (e.g., 100s to 1000s) of artificial "neurons." Each neuron in a layer (N) may be connected by an artificial "synapse" to some or all neurons in a prior (N−1) layer and subsequent (N+1) layer to form a "partially-connected" or "fully-connected" neural network. The strength of each synapse connection is represented by a weight. Thus, a neural network may be represented by a set of all weights in the network.

A neural network is trained based on a learning dataset to solve or learn a weight of each synapse indicating the strength of that connection. The weights of the synapses are generally initialized, e.g., randomly. Training is performed by iteratively inputting a sample dataset into the neural network, propagating forward through the neural network to output a result of the neural network applied to the dataset, calculating errors between the expected (e.g., target) output and actual output, and propagating backwards through the neural network to adjust neural network weights using an error correction algorithm (e.g., backpropagation) to minimize errors. Training may be repeated until the error is minimized or converges. Typically, multiple passes (e.g., tens or hundreds) through the training set is performed (e.g., each sample is input into the neural network multiple times). Each complete pass over the entire training dataset is referred to as one "epoch."

State-of-the-art neural networks typically have between millions and billions of weights, and as a result require specialized hardware (e.g., a GPU) for both training and runtime (a.k.a. prediction or inference) phases. It is thereby impractical to run deep learning models, even in prediction mode, on most endpoint devices (e.g., IoT devices, mobile devices, or even laptops and desktops without dedicated accelerator hardware). Effectively running deep learning models on devices with limited processing speed and/or limited memory availability remains a critical challenge today.

To address the problem of limited hardware capacity, nowadays most deep learning prediction is conducted on a remote server or cloud. For example, a smart assistant (e.g., Alexa™) sends information (e.g., a voice signal) to the cloud, the deep learning prediction is performed remotely at the cloud on dedicated hardware, and a response is sent back to the local device. Hence, these endpoint devices cannot provide deep learning based results if they are disconnected from the cloud, if the input rate is so high that it is not feasible to continuously communicate with the cloud, or if very fast prediction is required where even the dedicated hardware is not fast enough today (e.g., deep learning for high frequency trading).

Accordingly, there is a need in the art to increase the efficiency and processing speed of the computer performing deep learning using a neural network in training and/or prediction modes.

SUMMARY OF THE INVENTION

A device, system and method is provided to significantly increase the processing speed and efficiency of executing a neural network by, instead of activating all neurons across the entire neural network in a single pass (a "fully-activated" neural network), embodiments of the invention activate only a subset of neurons along selective pathways across a portion of the neural network multiple times (a "partially-activated" neural network). The neural network is thereby divided into many smaller partial runs, which has been experimentally shown to closely approximate the fully-activated neural network at significantly reduced processing time for fast and efficient machine learning. Accordingly, the aforementioned problems in the art are overcome to allow devices with basic hardware, e.g., endpoint devices, to efficiently execute neural networks locally, without relying on the cloud. Regardless of whether if training and/or prediction (inference) is performed on a local device or in the cloud, that training and/or prediction may be performed either using lower quality (and thus, less expensive) hardware (e.g., with lower processing speed) for the same time and accuracy, or with better performance using the same quality hardware, compared to conventional training and/or prediction.

According to some embodiments of the invention, there is provided a device, system and method for approximating a neural network. A neural network may be stored comprising N synapses or filters. The neural network may be partially-activated by iteratively executing a plurality of M partial pathways of the neural network to generate M partial outputs, wherein the M partial pathways respectively comprise M different continuous sequences of synapses or filters linking an input layer to an output layer, wherein the M partial pathways cumulatively span only a subset of the N synapses or filters of the neural network such that a significant number of the remaining the N synapses or filters are not computed. The M partial outputs of the plurality of M partial pathways may be aggregated to generate an aggregated output approximating an output generated by fully-activating the neural network by executing a single instance of all N synapses or filters of the neural network. Training or prediction of the neural network may be performed based on the aggregated output.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a flowchart of a method for partially activating a neural network using a plurality of partial pathways in accordance with some embodiments of the invention.

Figures 1A, 1B, 1C:
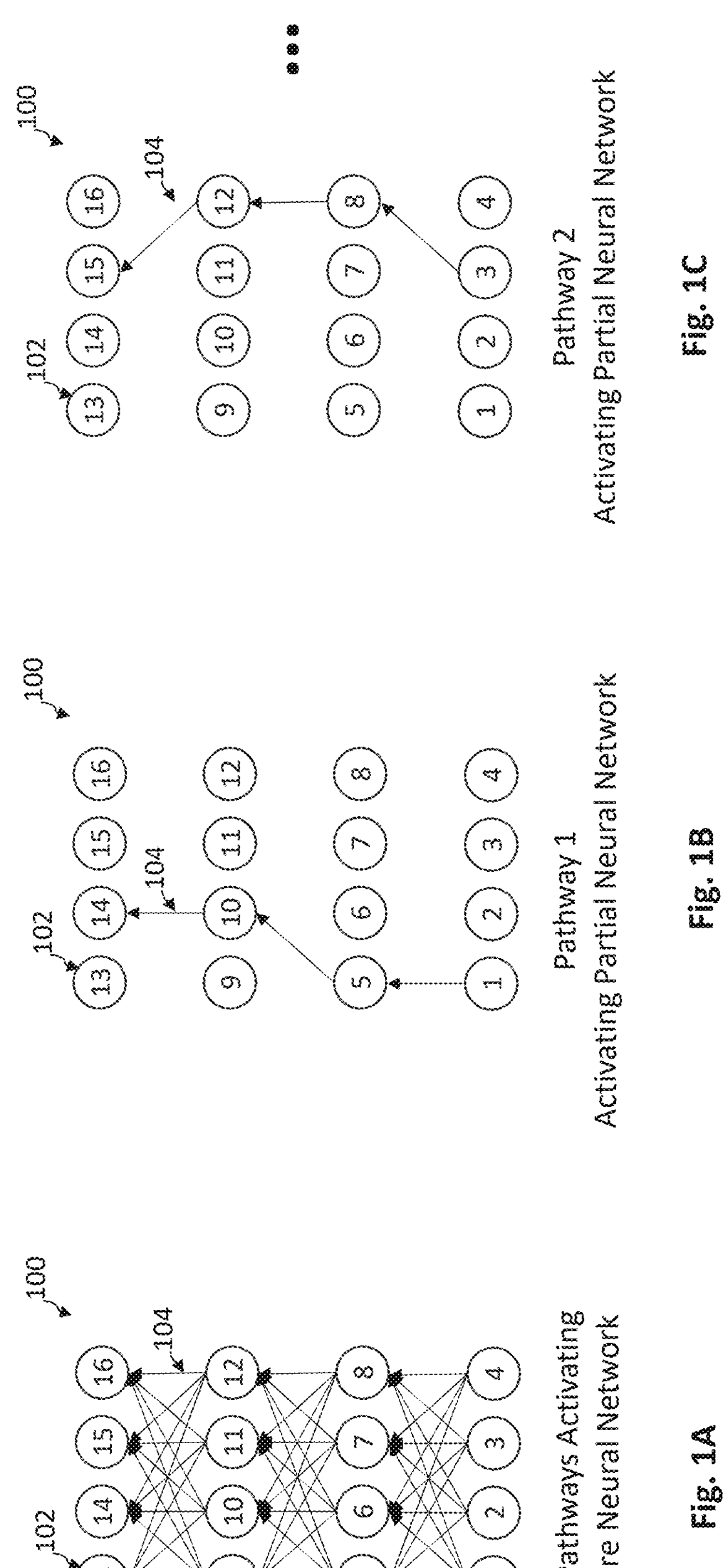
FIG. 1A is a schematic illustration of an example neural network with a plurality of N synapses in accordance with some embodiments of the invention.
FIGS. 1B and 1C are schematic illustrations of a first and second respective partial pathways of the neural network of FIG. 1A for partially activating the neural network, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention significantly increase the speed and efficiency of executing a neural network by implementing a "partially-activated" neural network approximating the neural network by activating only a subset of neurons or filters along select pathways across a portion of the neural network multiple times. The multiple partial pathways may be selected either fully at random, or semi-randomly e.g., based on prespecified heuristics (such as, probability of activation from one neuron to another proportional to their distance, columnar pattern of randomness, etc.). The outcome of the multiple partial passes of the partially-activated neural network may be aggregated to approximate the outcome of the fully-activated neural network, only with significantly fewer synapses (weights) or neurons to compute. In one embodiment, the semi-random selection would be such that the selected routes optimize memory access, e.g., by preferring activation of routes that do not involve frequent major memory skips (thus, resulting in a lower number of memory cache misses than a fully random implementation).

For a neural network with N synapses, whereas a conventional system activates all N synapses in each pass of the fully-activated neural network, embodiments of the invention activate only M partial pathways of $X_M$ respective synapses in the partially-activated neural network. The total number of synapses activated by the partially-activated neural network is thereby $$\sum_i^M X_M.$$

If the same number of synapses X are activated in each of the M pathways, the total number of synapses activated in the partially-activated neural network is X·M. To increase efficiency, the number of synapses in each pathway $X_M$ is significantly smaller (e.g., 0.1-1%) than the number of N synapses in the neural network, $X_M \ll N$, and the total number of synapses activated by the partially-activated neural network is less than (e.g., 10-50%) the number of all N synapses in the neural network, $$\sum_i^M X_M < N.$$

For example, a partially-activated neural network may activate a total of 20% of the synapses in the neural network. The greater the number of activated synapses in the partially-activated neural network, the greater the accuracy with which the partially-activated neural network approximates the fully-activated neural network, but the more synapse weight computations need to be solved. Thus, the proportion of synapses activated in the partially-activated neural network may be set depending on the tradeoff of priorities between speed and accuracy in each system or application. In one example, experiments show that an example partially-activated neural network activating a total of 10% of the N synapses performed with 99% accuracy and 10 times the speed of a conventional fully-activated neural network.

Additionally, experiments show that, for the same total number of synapses activated in a partially-activated neural network, accuracy is improved by executing more pathways of smaller size than fewer pathways of larger size. For example, an experiment found that a partially-activated neural network in which 1% of the neurons were activated in each of 10 runs yielded better results than a partially-activated neural network in which 10% of the neurons were activated in a single run. A reason for this trend is that executing more iterations of smaller pathways activates neurons with greater overall diversity, thereby widening the search space across the neural network. This is because each disconnected pathway can reach farther parts of the neural network, as compared to a larger pathway with fewer iterations that is primarily concentrated in one region of the neural network. Conversely, fewer pathways of larger size adds more synapses localized around the same region of the neural network, which typically yield duplicative results, providing diminishing returns. The more independent, diverse, and disconnected synapses in each pathway are, the wider the reach of the partially activated synapses, and typically the better the partially-activated neural network approximates the fully-activated neural network. Accordingly, in various embodiments, the number of iterations and synapses per iteration may be adjusted to optimize network diversity.

In various embodiments, the number of partial pathways M, the number of synapses activated per pathway $X_M$, and/or the total number $$\sum_i^M X_M$$

or proportion of the N synapses activated, in the partially-activated neural network may be fixed or dynamic. In some embodiments, the proportion of synapses is fixed such that the same number of X synapses are executed in each run of the neural network, and the results of the runs are averaged equally. In other embodiments, the proportion of synapses are fixed such that an increasing or decreasing number of synapses are executed in each sequential run of the neural network, and the results of the runs are weighted proportionally to the number of synapses executed in each run. In some embodiments, the proportion of synapses are dynamically adjusted to asymptotically decrease and increase, as the prediction results converge or diverge in multiple runs (in prediction mode) and/or as the error converges to or diverges from zero (in training mode), respectively. In some embodiments, the proportion of synapses are dynamically adjusted based on real-time data, e.g., monitoring the availability of hardware resources, such as, processor speed, memory space available, remaining battery life, and/or other hardware or software resources.

Regarding the number M of the partial pathways, in some embodiments, a variable number M of the partial pathways may be iteratively executed until the prediction results converge or the accuracy of the training results are above a predetermined threshold (or equivalently, the error is below a predetermined threshold) with respect to the training dataset. In some embodiments, a variable number M of the partial pathways may be iteratively executed until a computation time or decision time is reached. In real-time applications, a processor may only have a duration of time to make a decision. For example, a vehicle may have 1 second to decide whether or not to stop, and the system may execute as many partial pathways as possible in that time. Because partial activation used fewer computations per run, more partial runs of a neural network may be performed in a fixed time, and thus the accuracy of the output may be improved in a fixed time, as compared to full activation of the same neural network.

In various embodiments, the M pathways of the partially-activated neural network may be selected fully or semi-random. For example, a first "seed" neuron or synapse may be selected fully randomly, whereas each subsequent seed neuron or synapse may be selected semi-randomly to maximize the diversity of and maintain an even distribution of seed neurons for each pathway, thereby optimizing the performance of partially activating the neural network. Similarly, each subsequent neuron, synapse, or pathway selection may be selected semi-randomly to prefer an even distribution of the M pathways. A Monte Carlo or other random sampling technique may be used.

In some embodiments, the multiple partial pathways may be selected based on individual characteristics of each input into the neural network. In such cases, each input may have a characteristic profile and the pathways may be selected differently for each different input sample based on its characteristic profile. Characteristic profiles and the resulting selected pathways may be unique or non-unique (the same for similar inputs). In one example, an input image that contains a dog may result in activation of different pathways than an input image that contains a cat. The selection of these pathways could either be deterministic (e.g., the input to the neural network activates some synapses or filters only, which in turn activates others), or stochastic (e.g., semi-random), e.g., there is still randomness in the selection of pathways, but the probability of each pathway is determined by the characteristic of inputs. The selection probability can be defined by an equation (e.g., intensity of input and activation of synapses/filters at different locations), or learned either during a training phase of a neural network, or using another learning method such as genetic or evolutionary algorithms.

In some embodiments, the neural network may be trained to learn, which M pathways to execute, or the execution probability of each pathway, to achieve optimal results (in order to optimally select the M pathways of the partially-activated neural network). In some embodiments, the probability of each pathway may be determined based on specific inputs, input type, or characteristic profiles thereof. The neural network may be trained to determine the optimal parameters for partial activation that achieves the greatest neural network diversity and/or most closely match the fully-activated neural network. For example, the neural network may be trained to determine the optimal number of M iterations, number of synapses $X_M$ activated per iteration, total number of activated neurons $$\sum_i^M X_M,$$

distribution of activated neurons or pathways, convergence threshold, etc. In various embodiments, training may be executed on the neural network itself or a separate "selection" neural network on top of the partially-activated neural network.

Some embodiments may provide "ensemble networks" in which a plurality of N different neural networks are trained or used to predict for the same task. Ensemble networks run all of the N neural networks, and then average their N outputs. Ensemble networks generally improve accuracy, but are typically much slower to run (e.g., N times slower) compared to a single neural network. In some embodiments, partial activation may divide the M partial pathways among the N networks of the ensemble. Partial pathways may be divided evenly or preferentially among the N networks, e.g., based on performance characteristics. Thus, embodiments of the invention can benefit from the accuracy of ensemble networks, while minimizing their disadvantages for speed.

Various patterns may be implemented for the pathways. In one embodiment, a "linear" pathway comprises a chain of neurons connected one-to-one, where a single neuron in each layer is connected to only a single neuron in a subsequent layer, e.g., by activating a single synapse with the greatest weight between those layers. In another embodiment, a "branching" pathway comprises a chain of neurons connected one-to-many or many-to-one, where a single neuron in a layer is connected to multiple neurons in a subsequent or prior layer by activating multiple of its synapses (all or a plurality with above threshold weights). For RNNs, partial pathways may also include synapses that loop back from neurons in a layer to the same layer. Any other pathway pattern may be used, such as, skip (layer-jumping) paths, recurrent (looping) paths, weaving paths, or a combination thereof.

In various embodiments, the M partial pathways of the neural network may be executed in sequence (one pathway executed at a time), in parallel (all M partial pathways executed simultaneously), or in a semi-parallel manner (subgroups of partial pathways executed simultaneously).

In various embodiments, the partial pathway method may be used only during prediction mode (forward propagation though the neural network only), only during training mode (forward and backward propagation though the neural network), or during both prediction and training modes. Additionally or alternatively, the partial pathway method may be used across only portions of the neural network, for example, only specific neural network layers, regions, channels, iterations, etc. When partial-activation of partial pathways is not implemented, full-activation of all synapses in the entire neural network may be activated. Thus, in some embodiments, the inventive partially-activated neural network method may be combined with the fully-activated neural network method to create a hybrid method, in which each method is respectively used for different layers, regions, channels, iterations, modes, etc. of the neural network.

Some embodiments of the invention may approximate or mimic training or prediction of a target neural network without storing the target neural network itself (e.g., avoiding its storage altogether in any memory of the training of predicting device) and/or without storing any neural network in permanent memory (e.g., only storing temporary neural networks on the fly in the device's temporary memory). Embodiments of the invention may achieve this by storing, in permanent memory, a random number generator, which when executed, randomly generates a random neural network stored in temporary (but not permanent) memory. The random neural network, though random, may be selectively partially-activated to approximate the behavior of the non-stored target neural network by iteratively executing the plurality of M partial pathways of the random neural network that correspond to or approximate a subset of synapses or filters of the non-stored target neural network (and not executing the remaining synapses or filters of the random neural network). Accordingly, embodiments of the invention mimic the target neural network without using any permanent memory to store it (only storing the random number generator in permanent memory, which is typically an extremely compact sequence of code), thereby significantly reducing permanent memory consumption compared to storing the target neural network itself. Although temporary memory is used to store the random neural network, the random neural network is arbitrary and so may be immediately deleted after use (e.g., a new random neural network may be used each time training or prediction is performed). Further, in some embodiments, the temporary memory may only store the subset of activated partial pathways of the random neural network and not the remaining non-activated pathways, significantly reducing its storage in the temporary memory as well.

The partial pathway method may be used to approximate all types of neural networks, for example, including partially-connected neural networks, fully-connected neural networks (e.g., shown in FIG. 1A), convolutional neural networks (CNNs) (e.g., shown in FIG. 2), recurrent neural networks (RNNs), restricted Boltzmann machines (RBM), or in general any neural network model which involves a combination of neurons, filters, and/or weights.

Reference is made to FIG. 1A, which schematically illustrates an example neural network 100 in accordance with some embodiments of the invention.

Neural network 100 includes a plurality of artificial neurons 102. Artificial neurons 102 may be arranged in a hierarchy of multiple layers. Neural network 100 may include an input layer (neurons 1-4), one or more middle or hidden layer(s) (neurons 5-8), and an output layer (neurons 9-12). Each neuron 102 in each layer is connected by an artificial synapse connection 104 to some neurons (partially-connected) or to all neurons (fully-connected) in an adjacent layer. Neurons (1-4) in the input layer are connected to neurons in the subsequent higher layer, neurons (5-8) in the middle layer are connected to neurons in both the previous and subsequent layer, and neurons (9-12) in the output layer are connected to neurons in the previous lower layer. In the example shown in FIG. 1A, neural network 100 has 16 neurons 102 connected by a total of N=48 synapses 104. Neural network 100 may be represented by a plurality of weights representing the strengths of the respective plurality of synapse connections 104.

Although FIG. 1A shows a fully-connected neural network 100, neural network 100 may alternatively be a partially-connected neural network (removing some synapses), a recurrent neural network (adding self-connecting synapses between neurons in the same layer), or a convolutional neural network (replacing neurons with channels and synapses with filters).

Conventional systems fully-activate all N synapses of neural network 100 in each run. In each fully-activated run of neural network 100, a processor performs a single propagation through neural network 100 in a forward direction to compute all N synapses of the network (in prediction mode) and optionally an additional single propagation through neural network 100 in a backwards direction to re-compute all N synapses for error correction (in training mode). While a small neural network is shown in FIG. 1A for clarity (e.g., N=48 synapses), most current neural networks have millions or billions of synapses or filters, making each fully-activated run a computationally arduous and time-consuming task.

According to embodiments of the invention, there is provided a system and method for partially-activating neural network 100 to approximate the fully-activated neural network with high accuracy in significantly faster time. In each partially-activated run of neural network 100, a processor may perform a plurality of M partial pathways propagating through neural network 100 in a forward direction, where each Mth partial pathway propagates through $X_M$ respective synapses, to compute a total of $$\sum_i^M X_M$$

synapses in each run of the partially-activated neural network. This total number of $$\sum_i^M X_M$$

synapses computed in each run of the partially-activated neural network is only a partial subset of, and less than, the total number N of all synapses executed in each run of the fully-activated neural network. Thus, a significant number of the remaining synapses, not part of the M partial pathways, $$N - \sum_i^M X_M,$$

are not computed, yielding a reduction in the computations performed for each partially-activated prediction (forward) run of the neural network as compared to a fully-activated prediction run of the neural network. In one example, a partially-activated neural network includes four linear pathways (M=4) with three synapses per pathway (X=3), yielding a total of 12 synapses (25% of all N=48 synapses, for a speed-up of four times compared to a conventional fully-activated neural network). Similarly, in training mode, in addition to forward propagation, a backwards propagation of the same subset of $$\sum_i^M X_M$$

synapses is performed, yielding double the reduction in the computations performed for each partially-activated training (forward and backwards) run of the neural network as compared to a fully-activated training run of the neural network. Thus, in the prior example, the partially-activated neural network is trained eight times faster than the conventional fully-activated neural network.

Reference is made to FIGS. 1B and 1C, which schematically illustrate a first and second of the M partial pathways of a partially-activated neural network 100 of FIG. 1A, in accordance with some embodiments of the invention. In FIGS. 1B and 1C, while only two partial pathways are illustrated due to space limitations, an ellipsis indicates that a greater number M of partial pathways may be used (e.g., M=3, . . . , 10, . . . , 100, . . . , 1000, . . . , 1,000,000, . . . , 1,000,000,000, . . . ).

The multiple partial pathways shown in FIGS. 1B and 1C comprise different respective sequences of synapses continuously linking a single neuron in an input layer (e.g., bottom layer) to a single neuron in an output layer (e.g., top layer). In one embodiment, each partial pathway may include a continuous or uninterrupted sequence of synapses connected by a line or path propagating the network that is not disconnected from input neuron to output neuron (e.g., a pen drawing the propagation path is never raised from the paper). In the example shown in FIGS. 1B and 1C, the partial pathways are linear (one-to-one synapse connections in adjacent layers), but other pathway patterns, such as branching (one-to-many synapse connections in adjacent layers), skip paths, recurrent paths, weaving paths, or a combination thereof, may be used.

In some embodiments, a "hybrid" partial and fully activated neural network may be used where some regions, layers, channels, iterations, modes such as training vs. prediction, of the neural network are partially-activated, while others are fully-activated. For example, in one embodiment, the training mode (e.g., usually executed offline) may be full-activated, while the prediction mode (e.g., usually executed in real-time) is partially-activated because speed is typically more important during prediction than during training. Additionally or alternatively, because partial-activation is only an approximation of the full neural network, partial-activation may be used in an initial stage (e.g., the first P runs, or until the output converges to within a threshold) and thereafter the fully-activated neural network may be run (e.g., the next or last Q runs, or until the output converges to within a threshold) to confirm the initial partial pass approximation. Additionally or alternatively, partial pathways may connect specific layers (e.g., deeper middle layers which often have a less direct effect on the final result), while a fully connected network may be used for the remaining layers (e.g., layers near the input and output layers which often have a greater direct effect on the final result). Other hybrid combinations of partial and fully activated neural networks may be used.

Referring to FIG. 1B, in one embodiment, the first partial pathway may be initialized by a "seed" or start neuron (e.g., "1") or synapse (e.g., 1→5) in the input layer that is selected fully-randomly. Subsequent neurons or synapses in the first partial pathway may be selected fully-randomly or semi-randomly. For example, a semi-random selection may be performed by executing a random selection on options that are weighted to prefer certain options based on selection factors. Selection factors may include, for example, the strength of the various synapse weights (e.g., favoring synapses with stronger weights), the jump size or distances between neurons (e.g., favoring synapses with a larger jump size to increase diversity or a smaller jump size for more reliable outputs), evolutionary constraints, etc.

Referring to FIG. 1C, the second partial pathway may be initialized by a seed neuron (e.g., "3") or synapse (e.g., 3→8) in the input layer that is selected fully-randomly or semi-randomly, e.g., considering the aforementioned selection factors and/or a "diversity" selection factor that maximizes the distance or difference between the neurons, synapses or pathways of the present second partial pathway to those in some or all prior (e.g., the first) partial pathway(s). Maximizing pathway diversity may increase the accuracy with which the M partial pathways approximate the full neural network 100. Alternatively or additionally, an extra selection neural network may select the pathways in the partially-activated neural network, where the selection neural network has been previously trained to optimize the accuracy with which a training dataset of partially-activated neural networks approximate their fully-activated counterpart neural networks. Random sampling may be implemented using, for example, a Monte Carlo, or other randomization method.

Figure 2:
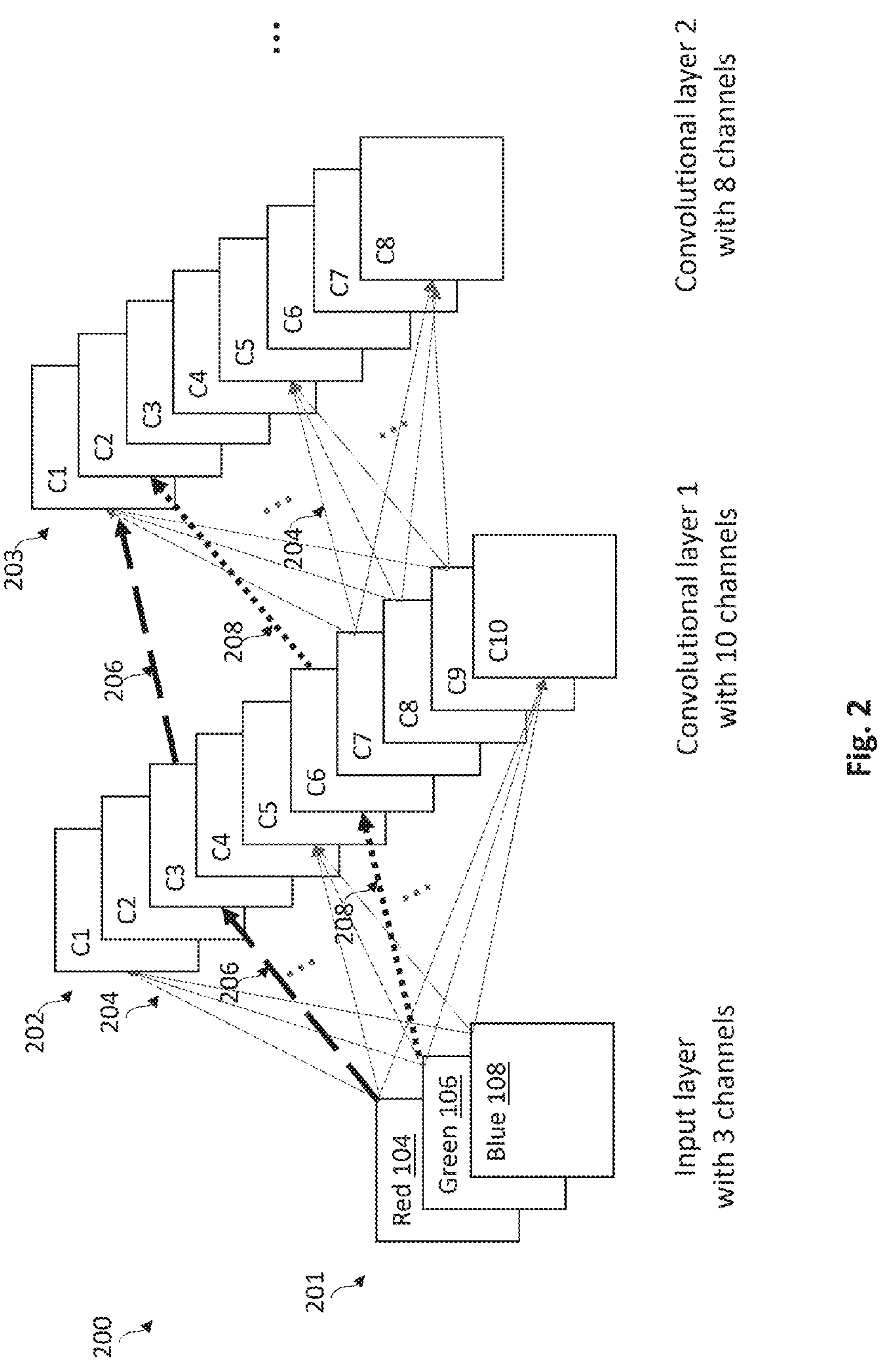
FIG. 2 is a schematic illustration of partially activating a convolutional neural network, in accordance with some embodiments of the invention.

Reference is made to FIG. 2, which schematically illustrates partial activation of a convolutional neural network 200, in accordance with some embodiments of the invention.

Convolutional neural network 200 includes an input layer 201, one or more convolutional layers 202 and 203, and one or more output layers. Each layer 201, 202, 203, . . . of CNN 200 may have one or a plurality of channels. In the example shown in FIG. 2, the input layer 201 represents a color image and has three color-channels 204-208 (e.g., red, green and blue channels). The first convolution layer 202 has a plurality of (e.g., ten) channels (e.g., C1-C10) and the second convolution layer 203 has a plurality of (e.g., eight) channels (e.g., C1-C8). Each convolution channel may represent a feature map of a feature, such as edges, lines, circles, or more complex objects in higher layers, such as apples, hammers, etc. These channels of features typically emerge entirely from the training process of the neural network (and are not manually specified).

In a fully-connected CNN, each channel in a layer may be connected to each channel in a subsequent layer by a convolution filter 204. For example, each color-channel 204-208 of input layer 201 may be connected to each convolutional channel C1-C10 in first convolution layer 202, which may in turn be connected to each convolutional channel C1-C8 in second convolution layer 203. In the example of FIG. 2, there are three channels 204-208 in the input layer 201, ten channels C1-C10 in the first convolution layer 202, and eight channels C1-C8 in the second convolution layer 203, resulting in a total of N=240 filters 204 connecting every pair of channels from the input and convolution layers 201, 202, 203, . . . . CNN 200 typically has many more convolution layers and/or other (e.g., max-pooling) layers than shown, which causes the number of filters to grow exponentially (e.g., to thousands, millions, or billions of filters 204).

Embodiments of the invention may partially activate the convolutional neural network 200 of FIG. 2 by iteratively executing a plurality of M partial pathways 206 and 208 that cumulatively span only a subset of all N filters 204 of the convolutional neural network 200. The M partial outputs generated thereby may be aggregated to approximate an output of fully-activating all N filters of the neural network, but with significantly less processor effort and computational time. Only two partial pathways 206 and 208 are shown so as not to obscure the figure, though many more may be used, as long as the total number of filters in all partial pathways is less than the total number of all filters N in the network.

In CNNs, filters may be two-dimensional (2D) or three-dimensional (3D). 2D filters connect each single channel in a first layer with a single channel in a second layer and 3D filters connect each single channel in a second layer with a plurality of channels in a first layer. For example, the convolutional neural network 200 shown in FIG. 2 may connect the input and $1^{st}$ convolution layers with thirty 2D filters, or ten 3D filters. Partial activation may selectively activate (and skip) 2D or 3D filters, or any combination thereof, in a CNN.

Figure 3:
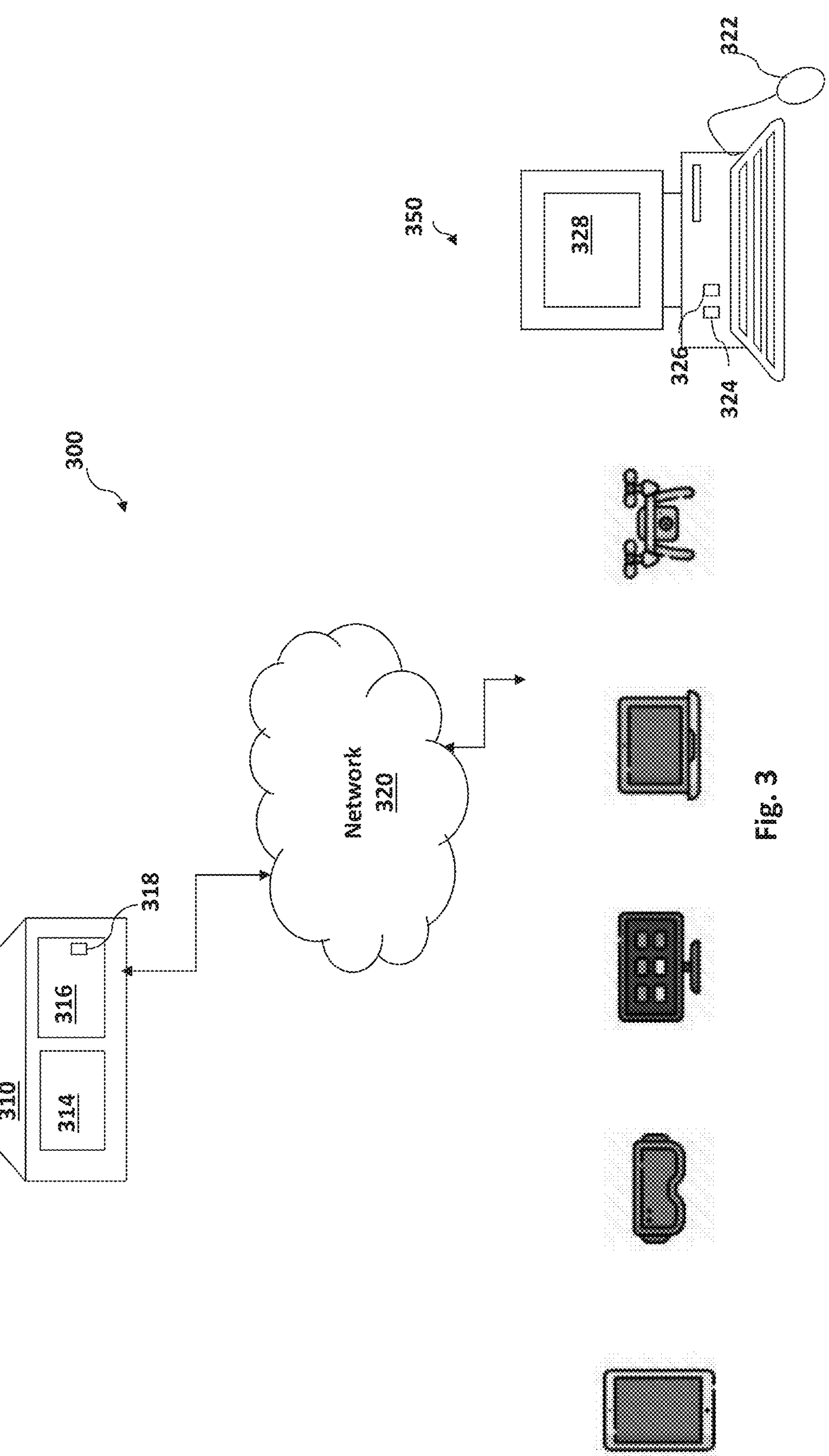
FIG. 3 is a schematic illustration of a system for partially activating a neural network using a plurality of partial pathways in accordance with some embodiments of the invention.

Reference is made to FIG. 3, which schematically illustrates a system 300 for partially-activating a neural network using a plurality of M partial pathways, in accordance with some embodiments of the invention. System 300 may store and/or generate the data structures and train and/or predict by partially-activation of neural networks as described in reference to FIGS. 1A-1C, 2 and 4. For example, in reference to FIGS. 1A-1C, system 300 may partially-activate neural network 100 of FIG. 1A using the first and second partial pathways of FIGS. 1B-1C. In another example, in reference to FIG. 2, system 300 may partially-activate convolutional neural network 200 using partial pathways 206 and 208.

System 300 may include one or more local endpoint device(s) 350 and one or more remote server(s) 310 accessible to the local device via a network and/or computing cloud 320. Typically, the neural network is trained by remote server 310 and run for prediction at one or more local endpoint devices 350, although either remote server 310 and/or local endpoint devices 350 may train and/or predict the neural network using partial activation according to embodiments of the invention. In particular, partially-activating the neural networks significantly reduces the computational effort for prediction and training, as compared to conventional fully-activated neural networks, to allow local endpoint devices 350, which typically have very limited memory and processing capabilities, to quickly and efficiently perform such prediction and/or training. When local endpoint devices 350 perform training and runtime prediction, remote server 310 may be removed.

Remote server 310 may have a memory 316 for storing a neural network and a processor 314 for training and/or predicting based on the neural network. Remote server 310 may store a complete neural network (e.g., 100 of FIG. 1A or 200 of FIG. 2) and remote processor 314 may partially activate the neural network. In some embodiments, remote server 310 may have specialized hardware including a large memory 316 for storing a neural network and a specialized processor 314 (e.g., a GPU). Memory 316 may store data 318 including a training dataset and data representing a plurality of weights of synapses or filters of the neural network. Data 318 may also include code (e.g., software code) or logic, e.g., to enable storage and retrieval of data 318 according to embodiments of the invention.

Local endpoint device(s) 350 may each include one or more memories 326 for storing a neural network (e.g., 100 of FIG. 1A or 200 of FIG. 2) provided in some embodiments of the invention. The memory 326 may store each of a plurality of weights of synapses or filters of the neural network. Local endpoint device(s) 350 may each include one or more processor(s) 324 for partially activating the neural network for training and/or prediction, based on the weights of the synapses or filters of the neural network stored in memory 326. During prediction, the neural network is run forward once. During training, the neural network is run twice, once forward to generate an output and once backwards for error correction (e.g., backpropagation). Each time the neural network is run, the number of computations is based on the number of synapses traversed by the M partial pathways and the speed is increased proportionally to the reduction in the number of weights not computed by the partial activation of the neural network.

Remote processor 314 and/or local processor 324 may partially activate the neural network by iteratively selecting and executing M partial pathways through the neural network (e.g., first and second partial pathways of FIG. 1B-1C or partial pathways 206 and 208 of FIG. 2). Remote processor 314 and/or local processor 324 may execute a random number generator to randomize selection of the M partial pathways. Remote processor 314 and/or local processor 324 may aggregate M partial outputs respectively generated by the M partial pathways to approximate a single run of the complete neural network in significantly less time than a conventionally operated processor. As shown experimentally, a processor (e.g., remote and/or local processor(s) 314 and/or 324) that partially-activated an example neural network by traversing 10% of the total number of N synapses, performed with 99% of the accuracy and 10 times the speed of the processor fully-activating the neural network.

In some embodiments, remote memory 316 and/or local memory 326 may include one or more permanent memories and/or one or more temporary memories. Instead of storing a neural network, the one or more permanent memories may store a random number generator, which when executed by remote processor 314 and/or local processor 324, respectively, randomly generates a random neural network that is stored in the one or more temporary memories. Remote processor 314 and/or local processor 324 may approximate an output of a target neural network (e.g., 100 of FIG. 1A or 200 of FIG. 2) that is not stored in the permanent and temporary memories by iteratively executing the plurality of M partial pathways of the random neural network that correspond to or approximate a subset of synapses or filters of the non-stored target neural network. By not storing the target neural network, permanent memory usage is greatly reduced, and temporary memory resources are only used during training or prediction, after which the random neural network may be deleted from the temporary memory. In addition, in some embodiments, only the partially activated portion of the random neural network may be stored, and not the remaining non-activated portion, further reducing the temporary memory consumption.

Local endpoint device(s) 350 may include smart devices, personal computer, desktop computer, mobile computer, laptop computer, and notebook computer or any other suitable device such as a cellular telephone, personal digital assistant (PDA), video game console, etc., and may include wired or wireless connections or modems. Local endpoint device(s) 350 may include one or more input device(s) 322 for receiving input from a user (e.g., neural network parameters, such as, numbers, sizes, dimensions and configurations of neurons, synapses, and layers, accuracy or training thresholds, number of M partial activation iterations or partial pathways, number of synapses $X_M$ activated per iteration or pathway, total number or proportion of synapses or filters activated in a partially-activated neural network $$\sum_i^M X_M,$$

distribution of activated neurons, synapses, filters or pathways, in a partially-activated neural network, pattern of partial pathways, etc.). Local endpoint device(s) 350 may include one or more output device(s) 328 (e.g., a monitor or screen) for displaying data to a user generated by local endpoint device(s) 350 or remote server 310.

In various applications, local endpoint device(s) 350 is part of a system for image recognition, computer vision, virtual or augmented reality, speech recognition, text understanding, or other applications of deep learning. In the application of facial recognition, a device may use partial activation to efficiently perform facial recognition to trigger the device to unlock itself or a physical door when a match is detected. In the application of security, a security camera system may use partial activation to efficiently detect a security breach and sound an alarm or other security measure. In the application of autonomous driving, a vehicle computer may use partial activation to control driving operations, e.g., to steer away to avoid a detected object.

Network 320, which connects local endpoint device(s) 350 and remote server 310, may be any public or private network such as the Internet. Access to network 320 may be through wire line, terrestrial wireless, satellite or other systems well known in the art.

Local endpoint device(s) 350 and remote server 310 may include one or more controller(s) or processor(s) 314 and 324, respectively, for executing operations according to embodiments of the invention and one or more memory unit(s) 316 and 326, respectively, for storing data 318 and/or instructions (e.g., software for applying methods according to embodiments of the invention) executable by the processor(s). Processor(s) 314 and 324 may include, for example, a central processing unit (CPU), a graphical processing unit (GPU, a field-programmable gate array (FPGA), an application-specific integrated circuit (ASIC), a digital signal processor (DSP), a microprocessor, a controller, a chip, a microchip, an integrated circuit (IC), or any other suitable multi-purpose or specific processor or controller. Memory unit(s) 316 and 326 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Other devices and configurations may be used, for example, data 318 may be stored locally in memory 326 and no separate server 310 may be used.

Reference is made to FIG. 4, which is a flowchart of a method for approximating a neural network by partially-activating the neural network using a plurality of M partial pathways in accordance with some embodiments of the invention. The operations of FIG. 4 may be executed by a processor (e.g., one or more processor(s) 314 and/or 324 of FIG. 3) using data stored in a memory (e.g., one or more memory unit(s) 316 and/or 326 of FIG. 3).

In operation 400, a processor may store a neural network (e.g., in FIG. 1A or 200 in FIG. 2) comprising a total of N synapses or filters in a memory. A CNN may have filters that are 2D and/or 3D.

In operation 410, a processor may randomly select a pathway "seed" to initiate a first partial pathway traversing the neural network.

In operation 420, a processor may partially-activate the neural network by iteratively executing a plurality of M partial pathways of the neural network to generate M partial outputs. The M partial pathways may respectively comprise M different continuous sequences of synapses or filters linking an input layer to an output layer. The M partial pathways may cumulatively span only a subset of the N synapses or filters of the neural network such that a significant number of the remaining the N synapses or filters are not computed. In some embodiments, a total number $$\sum_i^M X_M$$

of synapses or filters partially-activated by executing the M partial pathways is significantly less than the total number N of all synapses or filters in the neural network. The shape of the M partial pathways may be linear (e.g., connecting each synapse or filter to only a single other synapse or filter), branching (e.g., connecting each of a plurality of synapses or filters to multiple other synapses or filters), recurrent paths that loop from the same layer to itself, weaving paths, or a combination thereof.

In some embodiments, the neural network is one of an ensemble of multiple neural networks whose outputs are aggregated or averaged for training or predicting the same outcome. In such embodiments, the M partial pathways may be divided (e.g., equally or preferentially/non-equally) among the plurality of neural networks in the ensemble. The processor may execute the M partial pathways in sequence or in parallel.

In some embodiment, the neural network may be structured as a hierarchy of N levels each corresponding to a different phase of decision-making. The hierarchical neural network may be partially-activated in N multiple phases, stages, or passes, each corresponding to a different one of the N respective levels of the network hierarchy. The partial outputs of executing partial pathways in a relatively earlier stage for a relatively higher level may be used to determine which partial pathways to execute in a subsequent stage for a relatively lower level. For example, the first stage may generate a rough solution that is further and iteratively refined by each subsequent stage.

In some embodiments, the processor may select the plurality of M partial pathways in the neural network based on individual characteristics of each input into the neural network. In some embodiments, the processor may select the plurality of M partial pathways in the neural network during a training phase by learning optimal partial pathways to execute or optimal execution probabilities of partial pathways.

In various embodiments, the processor may select the plurality of M partial pathways in the neural network randomly, semi-randomly, or a hybrid or both randomly and semi-randomly. In one embodiment, the processor may fully-randomly select a first neuron, synapse or filter, and thereafter semi-randomly select subsequent neurons, synapses or filters to maximize diversity thereof in the M partial pathways. In one embodiment, the processor may semi-randomly select the plurality of M partial pathways by preferentially selecting partial pathways that minimize major memory skips in memory access for more efficient memory transfers. In one embodiment, the processor may select the M partial pathways by executing a separate selection neural network that has been previously trained to optimize the accuracy with which a training dataset of partially-activated neural networks approximate corresponding fully-activated neural networks. In some embodiments, the processor may semi-randomly select the plurality of M partial pathways based on heuristics or stochastics, e.g., based on the output accuracy of each pathway. For example, the processor may measure the accuracy of each pathway's output to determine or rank the performance of the pathways. The processor may implement a feedback loop, such that, pathways with higher performance ranking may be selected preferentially over pathways with lower performance ranking. In some embodiments, the processor may semi-randomly select the plurality of M partial pathways based on evolutionary constraints. Evolutionary constraints (e.g., genetic algorithms) may be used to allow preferential pathways to evolve by competing the different pathways against each other, to gradually select better and better performing pathways. In some embodiments, when a hierarchical neural network and/or multi-stage approach is used, a genetic algorithm may be executed to select the optimal performing partial pathways for each stage or level in the hierarchy.

In some embodiments, after the M partial pathways are selected during training, the neural network may be pruned to eliminate, delete, or zero, all non-activated synapses except those along the selected M partial pathways. Thus, the neural network may predict using only the selected M partial pathways (i.e., each inference would use exactly these M pathways). Thus, an initially dense (e.g., fully connected) neural network may be converted into a sparse neural network with significantly fewer (e.g., less than 50%) of the synapses or weights of the original neural network. This sparse neural networks may be used to increase the speed and reduce memory usage of the neural network, e.g., as disclosed in U.S. patent application Ser. No. 16/041,497 filed Jul. 20, 2018, which is incorporated herein by reference in its entirety.

The processor may tune the number M of partial pathways and the number of synapses or filters per pathway such that the aggregated output of the partially-activated neural network best approximates the output of the fully-activated neural network. In some embodiments, the number of synapses or filters in each of the M partial pathways may be fixed. The fixed may be constant, such that, the aggregated output is an average of the M partial outputs of the M partial pathways. Alternatively, the fixed number may increase or decrease for one or more sequential pathways, such that, the aggregated output is a weighted average of the M partial outputs, weighted based on the proportion of synapses or filters respectively executed in the corresponding one of the M partial pathways. In some embodiments, the processor may dynamically adjust the number of synapses or filters in each of the M partial pathways. In some embodiments, the dynamic number may be adjusted to asymptotically decrease and increase as the prediction results converge or diverge in multiple runs in prediction mode or as the error converges to or diverges from zero in training mode, respectively. In some embodiments, the processor may adjust the dynamic number of synapses or filters based on monitored real-time availability of hardware resources.

The processor may perform a hybrid combination of partially-activating and fully-activating the neural network. The neural network may be partially or fully activated for different layers, filters, channels, iterations, or modes of operation, of the neural network. In some embodiments, the processor may partially-activate the neural network only in training mode and fully-activate the neural network only in prediction mode, or may partially-activate the neural network only in prediction mode and fully-activate the neural network only in training mode, or may partially-activate the neural network in both training mode and prediction mode.

In operation 430, a processor may aggregate the M partial outputs to generate an aggregated partial-activation output approximating a full-activation output without executing all N synapses or filters of the neural network.

In operation 440, after repeating the partial activation of the neural network a plurality of Q times, a processor may use the cumulative output of the Q runs to predict or train the neural network (or ensemble of neural networks) based on the aggregated output.

Other operations or orders of operations may be used.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include a hierarchy of partial pathways. For example, in the case of classifying neural networks, an initial set of partial pathways may be used that are the best performing pathways for predicting a highest-level super-class classification. Once the highest-level classification is predicted, a subsequent set of partial pathways may be used that are the best performing pathways for predicting a next highest-level classification between the classes in this specific super-class. The process may iterate with a new optimized set of partial pathways for each classification level in the hierarchy. These sets of partial pathways can be created by running multiple experiments on training data and selecting the best performing sets of pathways for each classification. They can also be manually chosen, or a combination of both approaches.

Embodiments of the invention may include normalizing the output of a layer, to compensate for the reduced signal from that layer, when only part of the output layer is activated in a specific partial pathway forward. In some embodiments, values may be normalized per neuron, per layer, per entire pathway, or any combination thereof.

Embodiments of the invention may include an implementation where the first set of layers execute using all of the neurons in those layers, then the result from the last such layer can be saved and used as input to all of the partial pathway runs of the rest of the network.

Embodiments of the invention may include an article such as a non-transitory computer or processor readable medium, or a computer or processor non-transitory storage medium, such as for example a memory (e.g., memory unit(s) 316 and/or 326 of FIG. 3), a disk drive, or a USB flash memory, encoding, including or storing instructions, e.g., computer-executable instructions, which, when executed by a processor or controller (e.g., processor(s) 314 and/or 324 of FIG. 3), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for approximating a neural network, the method comprising:

partially-activating a neural network comprising N synapses or filters by iteratively executing a plurality of M partial pathways of the neural network to generate M partial outputs, wherein each of the M partial pathways propagates through $X_M$ respective synapses or filters, to compute a total of $\Sigma_i^M X_M$ synapses or filters in each run of the partially-activated neural network that is less than a total number N of all synapses or filters executed in each run of the fully-activated neural network; and aggregating the M partial outputs of the plurality of M partial pathways to generate an aggregated output approximating an output generated by the fully-activated neural network that executes a single instance of all N synapses or filters of the neural network.

2. The method of claim 1 comprising performing training or prediction of the neural network based on the aggregated output.

3. The method of claim 1 comprising:

storing, in permanent memory, a random number generator, which when executed, randomly generates the neural network to be a random neural network stored in temporary memory; and approximating an output of a target neural network that is not stored by iteratively executing the plurality of M partial pathways of the random neural network that approximate a subset of synapses or filters of the non-stored target neural network.

4. The method of claim 1 comprising approximating an ensemble of a plurality of neural networks by dividing the M partial pathways among the plurality of neural networks.

5. The method of claim 1, wherein the plurality of M partial pathways are arranged in a hierarchy of N levels, wherein the neural network is partially-activated in N multiple phases for the N respective levels, wherein the partial outputs of executing partial pathways in a stage for a relatively higher level is used to determine which partial pathways to execute in a subsequent stage for a relatively lower level.

6. The method of claim 1 comprising selecting the plurality of M partial pathways in the neural network by a technique selected from the group consisting of: randomly, semi-randomly, a hybrid or both randomly and semi-randomly, based on individual characteristics of each input into the neural network, during a training phase by learning optimal partial pathways to execute or optimal execution probabilities of partial pathways, based on evolutionary constraints that select partial pathways by competing different pathways against each other using a genetic algorithm, based on heuristic constraints that select optimal partial pathways based on tested accuracy of partial outputs of partial pathways, based on heuristic constraints that select optimal partial pathways that maximize output signals for a specific final result, and based on probabilities of activating synapses or filters along partial pathways proportional to the synapse or filter distance, columnar patterns of randomness, or strengths of the various synapse or filters weights.

7. The method of claim 1 comprising tuning the number M of partial pathways and the number of synapses or filters $X_M$ per pathway such that the aggregated output of the partially-activated neural network best approximates the output of the fully-activated neural network.

8. The method of claim 1 comprising:

partially-activating the neural network only in training mode and fully-activating the neural network only in prediction mode, partially-activating the neural network only in prediction mode and fully-activating the neural network only in training mode, or partially-activating the neural network in both training mode and prediction mode.

9. The method of claim 1 comprising performing a combination of partially-activating and fully-activating the neural network, wherein the neural network is partially or fully activated for different layers, filters, channels, iterations, or modes of operation, of the neural network.

10. The method of claim 1 comprising performing training or prediction of the neural network based on the aggregated output.

11. A system for approximating a neural network, the system comprising:

one or more processors configured to:

partially-activate a neural network comprising N synapses or filters by iteratively executing a plurality of M partial pathways of the neural network to generate M partial outputs, wherein each of the M partial pathways propagates through $X_M$ respective synapses or filters, to compute a total of $\Sigma_i^M X_M$ synapses or filters in each run of the partially-activated neural network that is less than a total number N of all synapses or filters executed in each run of the fully-activated neural network, and aggregate the M partial outputs of the plurality of M partial pathways to generate an aggregated output approximating an output generated by the fully-activated neural network that executes a single instance of all N synapses or filters of the neural network.

12. The system of claim 11 comprising:

one or more permanent memories; and one or more temporary memories, wherein the one or more permanent memories store a random number generator, which when executed by the one or more processors randomly generates the neural network to be a random neural network that is stored in the one or more temporary memories, and wherein the one or more processors are configured to approximate an output of a target neural network that is not stored in the permanent and temporary memories by iteratively executing the plurality of M partial pathways of the random neural network that approximate a subset of synapses or filters of the non-stored target neural network.

13. The system of claim 11, wherein the one or more processors are configured to tune the number M of partial pathways and the number of synapses or filters $X_M$ per pathway such that the aggregated output of the partially-activated neural network best approximates the output of the fully-activated neural network.

14. The system of claim 11, wherein the one or more processors are configured to perform training or prediction of the neural network based on the aggregated output.

15. The system of claim 11, wherein the one or more processors are configured to approximate an ensemble of a plurality of neural networks by dividing the M partial pathways among the plurality of neural networks.

16. The system of claim 11, wherein the plurality of M partial pathways are arranged in a hierarchy of N levels, wherein the neural network is partially-activated in N multiple phases for the N respective levels, wherein the partial outputs of executing partial pathways in a stage for a relatively higher level is used to determine which partial pathways to execute in a subsequent stage for a relatively lower level.

17. The system of claim 11, wherein the one or more processors are configured to select the plurality of M partial pathways in the neural network by a technique selected from the group consisting of: randomly, semi-randomly, a hybrid or both randomly and semi-randomly, based on individual characteristics of each input into the neural network, during a training phase by learning optimal partial pathways to execute or optimal execution probabilities of partial pathways, based on evolutionary constraints that select partial pathways by competing different pathways against each other using a genetic algorithm, based on heuristic constraints that select optimal partial pathways based on tested accuracy of partial outputs of partial pathways, based on heuristic constraints that select optimal partial pathways that maximize output signals for a specific final result, and based on probabilities of activating synapses or filters along partial pathways proportional to the synapse or filter distance, columnar patterns of randomness, or strengths of the various synapse or filters weights.

18. The system of claim 11, wherein the one or more processors are configured to:

partially-activate the neural network only in training mode and fully-activate the neural network only in prediction mode, partially-activate the neural network only in prediction mode and fully-activate the neural network only in training mode, or partially-activate the neural network in both training mode and prediction mode.

19. The system of claim 11, wherein the one or more processors are configured to perform a combination of partially-activating and fully-activating the neural network, wherein the neural network is partially or fully activated for different layers, filters, channels, iterations, or modes of operation, of the neural network.

20. A non-transitory computer readable medium storing instructions, which when executed by a processor, cause the processor to:

partially-activate a neural network comprising N synapses or filters by iteratively executing a plurality of M partial pathways of the neural network to generate M partial outputs, wherein each of the M partial pathways propagates through $X_M$ respective synapses or filters, to compute a total of $\Sigma_i^M X_M$ synapses or filters in each run of the partially-activated neural network that is less than a total number N of all synapses or filters executed in each run of the fully-activated neural network; and aggregate the M partial outputs of the plurality of M partial pathways to generate an aggregated output approximating an output generated by the fully-activated neural network that executes a single instance of all N synapses or filters of the neural network.

* * * * *